US008451000B2

(12) United States Patent  
Tiemann

(10) Patent No.: US 8,451,000 B2
(45) Date of Patent: May 28, 2013

(54) INDUCTIVE POSITION SENSOR, MEASURING SYSTEM EQUIPPED THEREWITH AND METHOD FOR OPERATING A POSITION SENSOR

(75) Inventor: Marc Oliver Tiemann, Salzburg (AT)

(73) Assignee: Dr. Johannes Heidenhain GmbH, Traunreut (DE)

( * ) Notice: Subject to any disclaimer, the term of this patent is extended or adjusted under 35 U.S.C. 154(b) by 335 days.

(21) Appl. No.: 13/062,438

(22) PCT Filed: Jul. 14, 2009

(86) PCT No.: PCT/EP2009/058989
§ 371 (c)(1),
(2), (4) Date: Mar. 4, 2011

(87) PCT Pub. No.: WO2010/028883
PCT Pub. Date: Mar. 18, 2010

(65) Prior Publication Data
US 2011/0169482 A1   Jul. 14, 2011

(30) Foreign Application Priority Data
Sep. 11, 2008 (DE) .................... 10 2008 046 741

(51) Int. Cl.
*G01B 7/30* (2006.01)
*G01B 7/14* (2006.01)

(52) U.S. Cl.
USPC ................... 324/207.25; 324/207.15

(58) Field of Classification Search
USPC .................. 324/207.15, 207.25
See application file for complete search history.

(56) References Cited

U.S. PATENT DOCUMENTS

| 6,111,402 | A | 8/2000 | Fischer | |
|---|---|---|---|---|
| 6,731,107 | B2 | 5/2004 | Reverdy | |
| 7,190,158 | B2 * | 3/2007 | Tiemann | 324/207.17 |
| 7,439,734 | B2 * | 10/2008 | Fischer | 324/207.25 |

FOREIGN PATENT DOCUMENTS

| DE | 197 51 853 | 6/1998 |
|---|---|---|
| JP | 2004-205456 | 7/2004 |
| WO | 01/88466 | 11/2001 |

OTHER PUBLICATIONS

International Search Report, issued in corresponding International Application No. PCT/EP2009/058989.

* cited by examiner

*Primary Examiner* — Bot Ledynh
(74) *Attorney, Agent, or Firm* — Kenyon & Kenyon LLP

(57) ABSTRACT

An inductive position sensor includes an electronic circuit, which is configured such that initially three digital signals are able to be generated from the signals detected by three receiver printed conductors. At least two position values are ascertainable by combining the three digital signals, and the position values are able to be supplied to a comparator. A measuring system includes, in addition to the position sensor, a data interface and sequential electronics which include the comparator.

21 Claims, 4 Drawing Sheets

INDUCTIVE POSITION SENSOR, MEASURING SYSTEM EQUIPPED THEREWITH AND METHOD FOR OPERATING A POSITION SENSOR

FIELD OF THE INVENTION

The present invention relates to an inductive position sensor for determining relative positions and to a method for operating an inductive position sensor. The present invention further relates to a measuring system, that is equipped with an inductive position sensor.

BACKGROUND INFORMATION

Inductive position sensors are used, for example, as rotary encoders to determine the angular position of two machine parts rotatable relative to each other. In inductive position sensors, excitation coils and receiver coils, for instance, in the form of printed conductors, are applied to a shared printed circuit board that is firmly joined to a stator of a rotary encoder, for example. Disposed oppositely to this printed circuit board is a further board often in the form of a graduated disk, on which electrically conductive and non-conductive surfaces are applied so as to alternate at periodic intervals as graduation region or graduation structure, and which is joined in torsionally fixed fashion to the rotor of the rotary encoder. When an electric excitation current changing over time is applied to the excitation coils, signals which are a function of the angular position are generated in the receiver coils during the relative rotation between rotor and stator. These signals are then further processed in evaluation electronics.

In addition, inductive position sensors are also frequently used for the direct measurement of longitudinal shifts along an axis. In so doing, the same measuring principle is used as for the rotary encoders indicated above, however, the receiver coils and the graduation structure then extend along the straight-line axis.

Inductive position sensors of this type are often used as measuring devices for electric drives to determine the relative movement or the relative position of corresponding machine parts. In this case, the position values, which are generated by the position sensors, are supplied via a suitable interface arrangement to sequential electronics for controlling the drives. Such a configuration, made up of position sensor, interface arrangement and sequential electronics, is denoted as a measuring system.

In many fields of application of such position sensors and measuring systems, there is the continuous desire that they satisfy safety-related requirements. Often, it must be possible for persons to be allowed to stay within a swiveling range of machine parts whose drives interact with the measuring system. Under these conditions, it is necessary to preclude these persons from getting into danger due to faults in the measuring system. Correspondingly, the possibility that material goods in the vicinity of the moving machine parts could be damaged should naturally be avoided at the same time.

In German Published Patent Application No. 197 51 853, an inductive position sensor is described in which the receiver coils are disposed within one track with a displacement that brings about a 90° phase shift of the received signals. In general, a failure of a receiver coil or a fault in the evaluation electronics would not be discovered.

Japanese Published Patent Application No. 2004-205456 describes an incremental encoder that generates three signals phase-shifted by 120°. However, a corresponding encoder does not satisfy higher safety-related requirements.

SUMMARY

Example embodiments of the present invention provide an inductive position sensor and a corresponding measuring system, respectively, by which high safety-related requirements are able to be satisfied.

Example embodiments of the present invention provide a method which permits safe operation of a corresponding position sensor.

The inductive position sensor according to example embodiments of the present invention includes a scanning printed circuit board, disposed on which are an excitation printed conductor for generating an electromagnetic field, and a (first) receiver track having a plurality of receiver printed conductors. The position sensor further includes a graduation element which is displaceable or rotatable relative to the scanning printed circuit board, and has a graduation track made up of electrically conductive and non-conductive graduation regions in alternation. The position sensor also includes an electronic circuit. On its part, the receiver track has at least three receiver printed conductors which are disposed such that in response to a relative movement—e.g., a relative rotation—between the graduation element and the scanning printed circuit board, signals are detectable in the receiver printed conductors of the receiver track, in this context, a phase shift at least between one pair of these signals deviating from n·90°, with n as a natural number; in particular, the number 0 is not to be assigned to the quantity of natural numbers. The electronic circuit is configured such that initially three digital signals are able to be generated from the signals detected by the receiver printed conductors of the (first) receiver track, and by combining the three digital signals, at least two position values are ascertainable as measure for the relative movement between the graduation element and the scanning printed circuit board. The position values are able to be supplied to a comparator in order to check the functioning of the position sensor.

The graduation element is thus displaceable or rotatable relative to the scanning printed circuit board, so that a corresponding relative movement is able to take place. The relative movement may be a rotational movement or a linear movement. Correspondingly, an angular position or a translatory position may be represented by the position values.

Phase shifts should be understood to be phase shifts, or electrical phase offsets, of the useful signals, the useful signals having a substantially lower frequency than the excitation current in the excitation coils. The phase shift is expediently indicated in a range from 0° to 360°. The phase shift between at least one pair of these signals is such that the signals exhibit a linear dependency with respect to each other.

Because the three signals in question are in digital form, combination of the three signals is understood to be a calculation of these signals, i.e., implementation of a calculation algorithm on the basis of the three signals as input data.

The ascertainable position values are based on signals coming from different receiver printed conductors, the signals of the respective receiver printed conductors being conductible through the electronic circuit on signal paths that are independent of each other. Accordingly, the digital position values are independent of each other in so far as they stem from different receiver printed conductors or different combinations of receiver printed conductors and were processed or ascertained or are ascertainable independently of each other in the circuit.

In example embodiments of the present invention, the electronic circuit is in an ASIC module.

Advantageously, the inductive position sensor is designed such that the first receiver track and a second receiver track having a plurality of receiver printed conductors are disposed on the scanning printed circuit board. The graduation element then includes the first graduation track and a second graduation track, the position sensor being configured such that in response to identical relative movement between the scanning printed circuit board and the graduation element, a smaller number of signal periods is able to be generated by the receiver printed conductors of the first receiver track than by the receiver printed conductors of the second receiver track. Identical relative movements are understood to be relative movements of equal size, for example, a relative rotation about a specific angular measure or a longitudinal shift by a specific linear measure. The inductive position sensor may also be designed such that more than two receiver tracks and more than two graduation tracks are provided.

In example embodiments of the present invention, the electronic circuit of the inductive position sensor is configured such that the position values are able to be supplied to an averager, the averager being a part of the electronic circuit.

Moreover, the electronic circuit may be configured such that initially three digital signals are able to be generated from the signals detected by the receiver printed conductors of the second receiver track, at least two position values being ascertainable by combining the three digital signals. The position values are then able to be supplied to an averager.

Advantageously, the electronic circuit is configured such that the average value generated by the averager is able to be supplied to a comparison element.

In example embodiments of the present invention, the inductive position sensor may be configured such that in response to a relative movement between the graduation element and the scanning printed circuit board, signals whose phase shifts are in each case 60° or 120° are detectable in the receiver printed conductors of the receiver track.

In the case of the method for operating the inductive position sensor, first of all, in response to a relative movement between the graduation element and the scanning printed circuit board, signals are detected in the receiver printed conductors of the receiver track, a phase shift at least between one pair of these signals deviating from n·90°, with n as a natural number. From the signals detected by the receiver printed conductors of the receiver track, initially three digital signals are generated by an electronic circuit. The three digital signals are combined such that at least two digital position values are ascertained. The position values are compared to each other, a fault message being triggered in response to a deviation of the position values which exceeds a predefined limiting value.

The comparison of the deviation of the position values to a predefined limiting value may be performed in the position sensor itself and/or in sequential electronics to which the position values are transmitted by the position sensor beforehand.

The first receiver track and a second receiver track having a plurality of receiver printed conductors are advantageously disposed on the scanning printed circuit board, the graduation element including the first graduation track and a second graduation track. In the case of this arrangement, in response to identical relative movement between the scanning printed circuit board and the graduation element, a smaller number of signal periods is generated by the receiver printed conductors of the first receiver track than by the receiver printed conductors of the second receiver track. In the indicated arrangement, in response to identical relative movement between the scanning printed circuit board and the graduation element, an uneven number of signal periods may also be generated by the receiver printed conductors of the first receiver track, and an even number by the receiver printed conductors of the second receiver track, or vice versa.

In example embodiments of the present invention, position values are supplied to an averager. In particular, in the case of the method, initially three digital signals may be generated in the electronic circuit from the signals detected by the receiver printed conductors of the second receiver track, at least two position values being ascertained by combining the three digital signals. The position values are then supplied to an averager in order to determine a corresponding average value. The average value generated by the averager may be supplied to a comparison element.

According to a further aspect, a measuring system includes the position sensor, and furthermore, a data interface as well as sequential electronics. The sequential electronics include the comparator, at least two position values being able to be supplied to the comparator via the data interface. The data interface advantageously includes an interface circuit, e.g., a corresponding interface module on the position sensor, a cable for transmitting the position values, as well as an interface circuit or an interface module in the sequential electronics. Alternatively, the position values may also be transmitted without a cable, so that instead of the cable, the data interface then has a corresponding transmitter and receiver element.

In further example embodiments of the measuring system, a fault message is able to be output by the sequential electronics if a deviation of the position values exceeds a predefined limiting value. Advantageously, the fault message may directly trigger an automatic shutdown of the machine connected to the measuring system, i.e., to the sequential electronics. Additionally, the fault message may then also be output on a screen, for instance, for diagnostic purposes.

The measuring system advantageously includes an inductive position sensor having a scanning printed circuit board, on which the first receiver track and a second receiver track having a plurality of receiver printed conductors are disposed, as well as a graduation element that has the first graduation track and a second graduation track. In this context, in response to identical relative movement between the scanning printed circuit board and the graduation element, a smaller number of signal periods is able to be generated by the receiver printed conductors of the first receiver track than by the receiver printed conductors of the second receiver track. Furthermore, the digital position values produced from the signals of the receiver printed conductors are combinable in the sequential electronics to form one position value.

Further advantages and details pertaining to the inductive position sensor, the method for operating an inductive position sensor, as well as the measuring system equipped with the position sensor are derived from the following description of exemplary embodiments with reference to the accompanying figures.

DETAILED DESCRIPTION

In the exemplary embodiment described below, a measuring system includes a rotary inductive position sensor, as well as an interface 5 for data transmission and sequential electronics 4.

Figure 1:
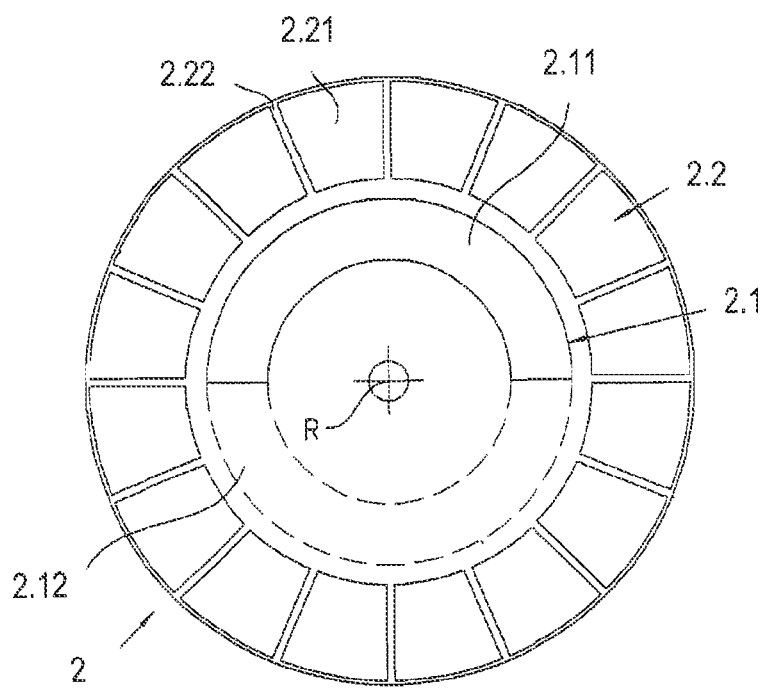
FIG. 1 shows a plan view of a graduated disk.
Figure 2:
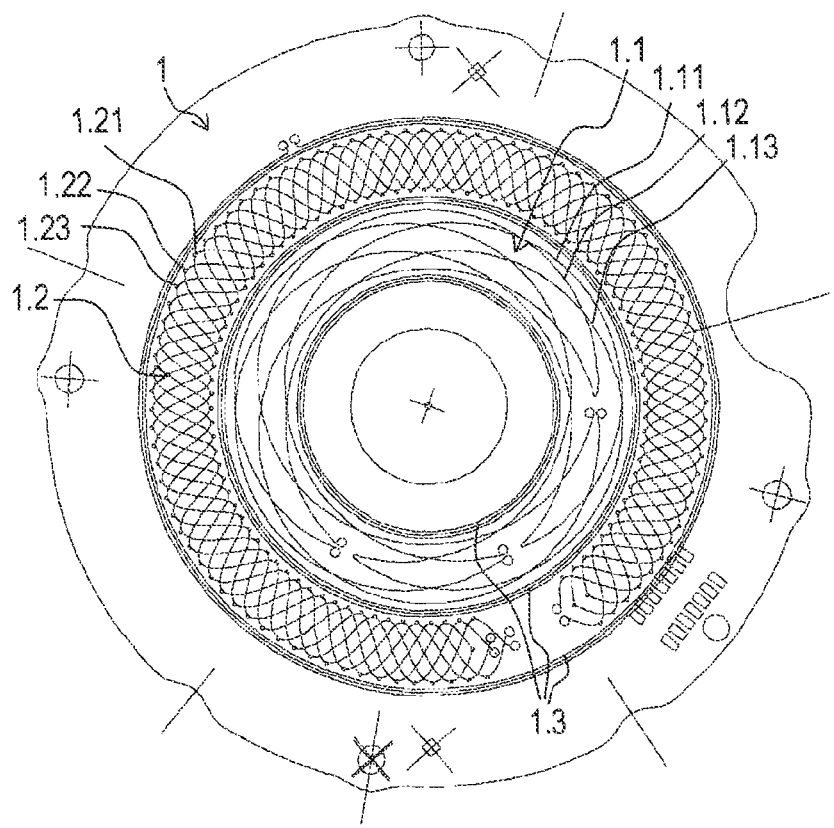
FIG. 2 shows a plan view of a scanning printed circuit board.
Figure 5:
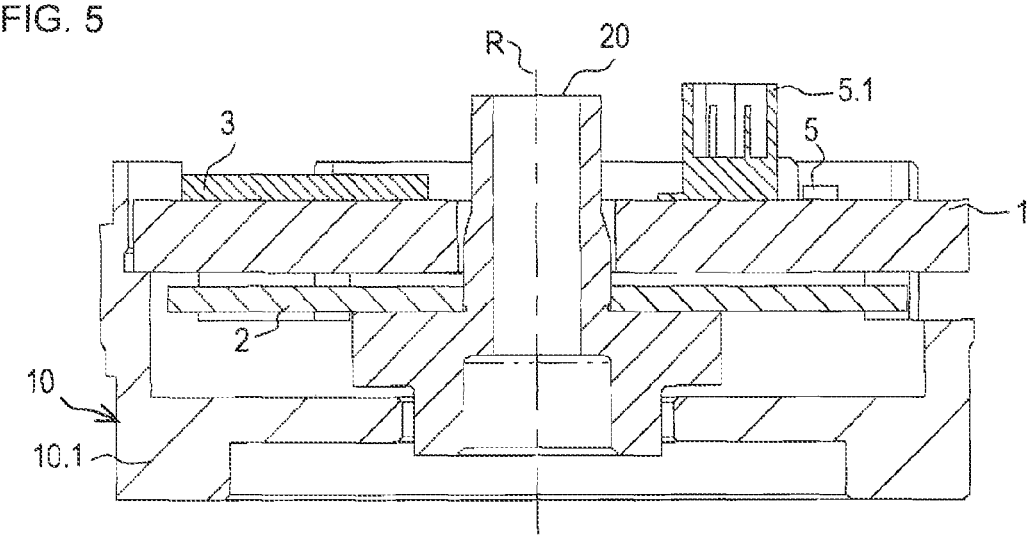
FIG. 5 shows a cross-section through an inductive position sensor.

FIGS. 1, 2 and 5 show the configuration of a position sensor in principle. According to FIG. 5, the position sensor has a rotor and a stator. In the exemplary embodiment described, the rotor includes a shaft 20 which, for example, may be mounted in rotationally fixed manner on a motor shaft to be measured. A graduation element in the form of an annular, graduated disk 2 having graduation tracks 2.1, 2.2—not shown in FIG. 5—is secured in rotationally fixed manner to a shoulder of shaft 20 in order to detect its angular position.

The stator includes a housing 10, to which a ring-shaped scanning printed circuit board 1 is attached as a carrier member. An ASIC module 3, in which an electronic circuit is located, is mounted on scanning printed circuit board 1. ASIC module 3 is used, inter alia, as an evaluation element. An interface module 5 and a plug-in connector 5.1 are also mounted on scanning printed circuit board 1. The rotor and the stator, i.e., shaft 20 and housing 10 are rotatable relative to each other about an axis of rotation R.

Graduated disk 2 is shown in FIG. 1. It is made up of a substrate 2.3 which, in the exemplary embodiment shown, is produced from epoxy resin, and on which two graduation tracks 2.1, 2.2 are disposed. Graduation tracks 2.1, 2.2 are circular, and are disposed concentrically relative to an axis of rotation R and with different diameter on substrate 2.3. The two graduation tracks 2.1, 2.2 are each made up of a periodic sequence of electrically conductive graduation regions 2.11, 2.21 and non-conductive graduation regions 2.12, 2.22 in alternation. In the example shown, copper is applied on substrate 2.3 as the material for electrically conductive graduation regions 2.11, 2.21. On the other hand, substrate 2.3 is not coated in non-conductive graduation regions 2.12, 2.22.

In the example embodiment shown, inner graduation track 2.1 is made up of a first semicircular graduation region 2.11 having electrically conductive material, here copper, as well as a second semicircular graduation region 2.12 in which there is no conductive material.

Radially adjacent to first graduation track 2.1 on substrate 2.3 is second graduation track 2.2, second graduation track 2.2 also being made up of a plurality of electrically conductive graduation regions 2.21, as well as non-conductive graduation regions 2.22 situated in between. In terms of material, the different graduation regions 2.21, 2.22 are formed in the same manner as graduation regions 2.11, 2.12 of first graduation track 2.1. In the exemplary embodiment shown, second graduation track 2.2 includes a total of sixteen periodically disposed, electrically conductive graduation regions 2.21, and correspondingly, sixteen non-conductive graduation regions 2.22 situated in between.

Scanning printed circuit board 1, shown in FIG. 2 and provided to scan graduated disk 2, includes three receiver printed conductors 1.11, 1.12, 1.13 as receiver coils in an inner receiver track 1.1, and a further three receiver printed conductors 1.21, 1.22, 1.23 in an outer receiver track 1.2. The related triads of receiver printed conductors 1.11, 1.12, 1 13; 1.21, 1.22, 1.23 of a specific receiver track 1.1, 1.2 are displaced relative to each other, here in particular, are displaced uniformly relative to each other.

Moreover, provided as excitation coils on scanning printed circuit board 1 are excitation printed conductors 1.3, which are applied on an inner, a middle and an outer excitation track. Scanning printed circuit board 1 itself has a centric bore hole and is multilayer.

In the assembled state of the position sensor, graduated disk 2 and scanning printed circuit board 1 are situated opposite each other, so that axis of rotation R extends through the midpoints of both elements, and in response to a relative rotation between graduated disk 2 and scanning printed circuit board 1, a signal which is a function of the specific angular position is able to be generated by induction effects in scanning printed circuit board 1.

A prerequisite for the formation of relevant signals is that excitation printed conductors 1.3 generate an electromagnetic excitation field, changing over time, in the area of receiver tracks 1.1, 1.2 and in the area of graduation tracks 2.1 and 2.2 scanned by them. In the exemplary embodiment shown, excitation printed conductors 1.3 are in the form of a plurality of plane-parallel, individual printed conductors traversed by current. If a current flows in the same direction through all excitation printed conductors 1.3 of one printed-conductor unit, then an electromagnetic field oriented in the shape of a tube or cylinder forms around the respective printed-conductor unit. The field lines of the resulting electromagnetic field extend in the form of concentric circles around the printed-conductor units, the direction of the field lines being dependent in a conventional manner on the current direction in the printed-conductor units.

The current direction of the printed-conductor units directly adjacent to a shared receiver track 1.1, 1.2, that is, the suitable interconnection of these printed-conductor units, must be selected to be opposite, so that the field lines in the area of receiver tracks 1.1, 1.2 are in each case identically oriented.

ASIC module 3 mounted on scanning printed circuit board 1 functions not only as an evaluation element, but also as an excitation control element, under whose control the excitation current is produced, and then flows through excitation printed conductors 1.3. The excitation current induces voltages in receiver printed conductors 1.11, 1.12, 1.13; 1.21, 1.22, 1.23 as a function of the angular position of graduated disk 2, these voltages being denoted hereinafter as signals S1.11, S1.12, S1.13, S1.21, S1.22, S1.23.

Figure 4A:
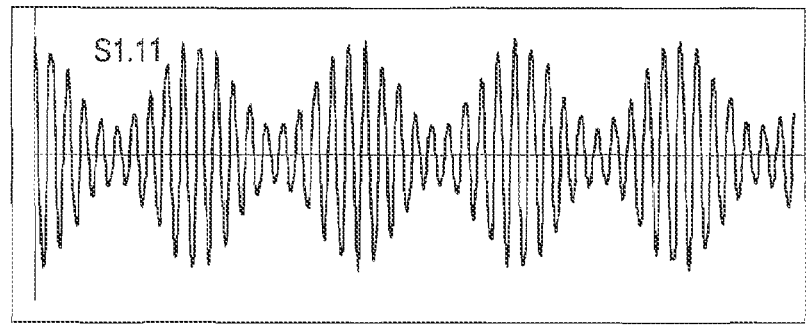
FIGS. 4a-d show signal patterns, as they occur in the position sensor.
Figure 4B:
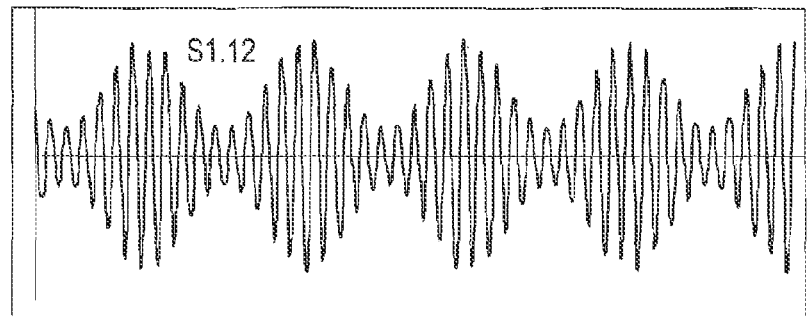
Figure 4C:
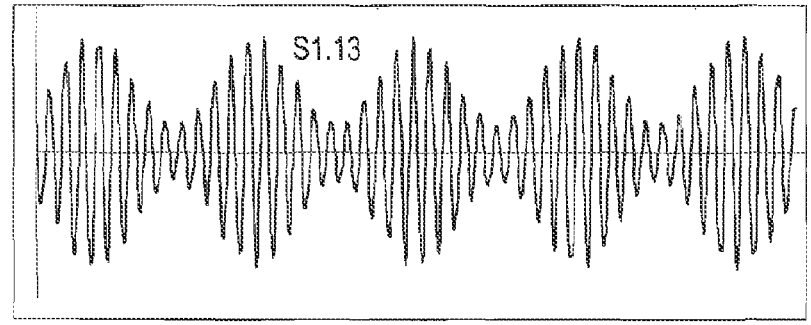

FIGS. 4a to 4c show only the patterns of high-frequency received signals S1.11, S1.12, S1.13 of inner receiver track 1.1. Corresponding to the arrangement of inner receiver track 1.1 and inner graduation track 2.1, here, one signal period is generated in a receiver printed conductor 1.11, 1.12, 1.13 per rotation, thus, given an angle of rotation or a relative movement of $2\pi$ (360°).

The three outer receiver printed conductors 1.21, 1.22, 1.23 each have sixteen, thus $2^4$, windings, so that a comparatively high-resolution incremental signal is able to be generated by outer receiver printed conductors 1.21, 1.22, 1.23 in response to the movement of graduated disk 2 relative to scanning printed circuit board 1. Within a movement of one rotation (angle of rotation of 360°) relative to the carrier member, receiver printed conductors 1.21, 1.22, 1.23 in each case supply sixteen signal periods in the scanning of graduation track 2.2. The three induced and amplitude-modulated signals S1.21, S1.22, S1.23 correspond in principle in their pattern to those of FIGS. 4a to 4c.

Figure 3:
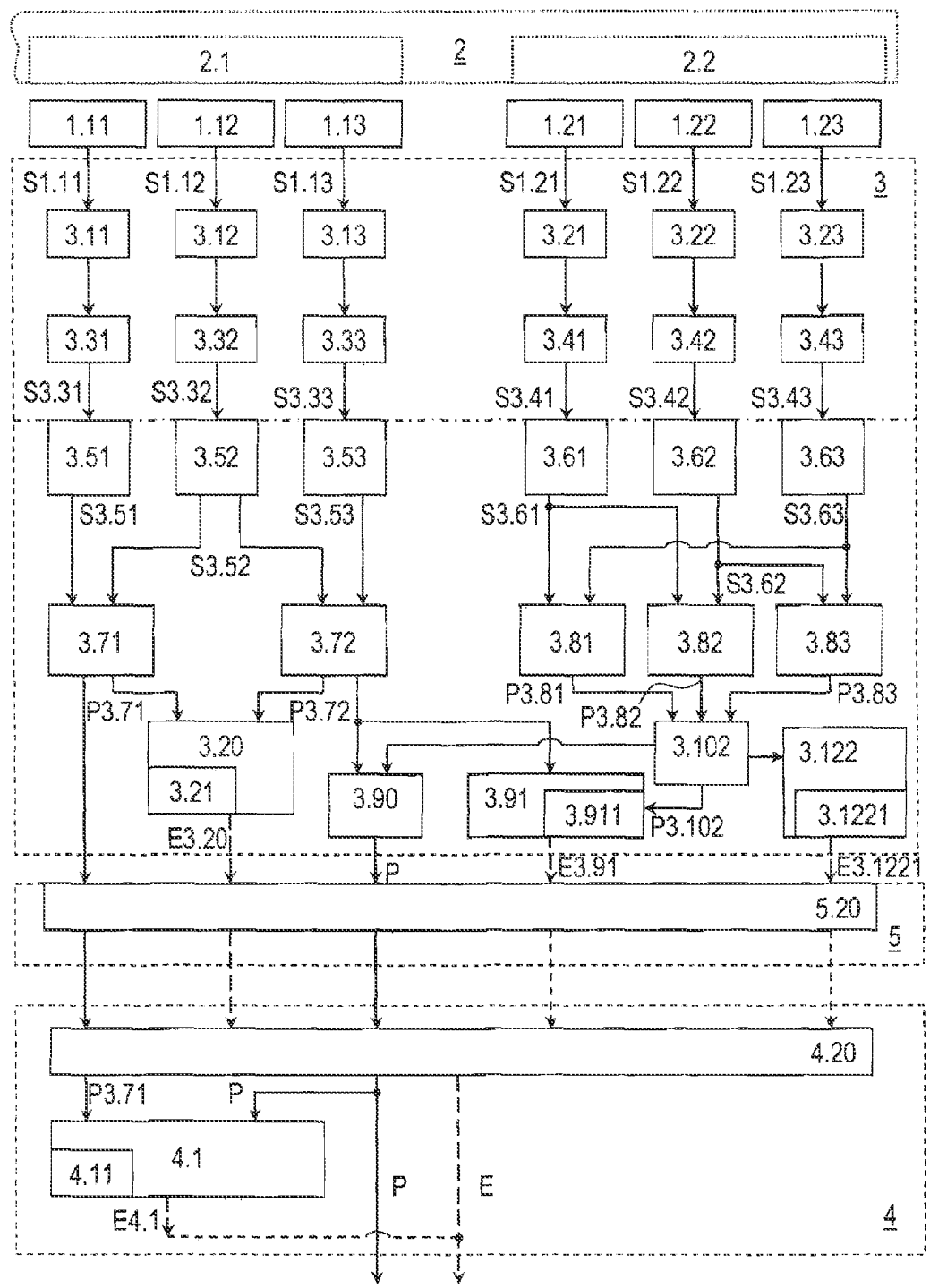
FIG. 3 shows a schematic representation of the function of an electronic circuit of a measuring system having the position sensor.

According to FIG. 3, signals S1.11, S1.12, S1.13, S1.21, S1.22, S1.23 are initially each supplied separately to an amplifier circuit 3.11, 3.12, 3.13, 3.21, 3.22, 3.23 of ASIC module 3, where analog signals S1.11, S1.12, S1.13, S1.21, S1.22, S1.23 are amplified.

Figure 4D:
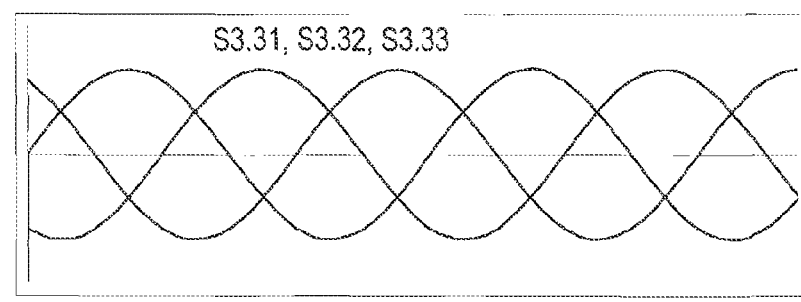

Amplified signals S1.11, S1.12, S1.13, S1.21, S1.22, S1.23 are then each conducted to a demodulator 3.31, 3.32, 3.33, 3.41, 3.42, 3.43, where signals S3.31, S3.32, S3.33, S3.41, S3.42, S3.43 are formed, which are the low-frequency, phase-adjusted amplitudes of amplified signals S1.11, S1.12, S1.13, S1.21, S1.22, S1.23. FIG. 4*d* shows signals S3.31, S3.32, S3.33 in a graph. Due to the staggered arrangement of receiver printed conductors 1.11, 1.12, 1.13, 1.21, 1.22, 1.23, during operation of the position sensor, three induced signal patterns are obtained per receiver track 1.1, 1.2, whose phase-adjusted amplitudes or useful signals each have a phase shift of 120° relative to each other.

Optionally, signals S3.31, S3.32, S3.33, S3.41, S3.42, S3.43 may be amplified again before they are fed to analog-to-digital converters 3.51, 3.52, 3.53, 3.61, 3.62, 3.63. There, digital signals S3.51, S3.52, S3.53, S3.61, S3.62, S3.63 are generated. Accordingly, three digital signals S3.51, S3.52, S3.53, S3.61, S3.62, S3.63 are formed per receiver track 1.1, 1.2. Thus, ASIC module 3 includes an analog part (above the broken line in FIG. 3) and a digital part (below the broken line in FIG. 3).

ASIC module 3 may be configured such that digital signals S3.51, S3.52, S3.53, S3.61, S3.62, S3.63 undergo a checking routine. For example, it may be checked whether the sum of signals S3.51, S3.52, S3.53 or of signals S3.61, S3.62, S3.63 deviates significantly from zero, or whether more than one of signals S3.51, S3.52, S3.53 or S3.61, S3.62, S3.63 has assumed the value zero. If this is the case, a fault message may be generated. Incidentally, the devices for performing these optional checking routines are not shown in FIG. 3. In general, the phase relationship of S3.51, S3.52, S3.53 or S3.61, S3.62, S3.63 may be checked in order to monitor for faults.

In logic circuits 3.71, 3.72 in the digital part of ASIC module 3, two mutually independent position values P3.71, P3.72 are ascertained or calculated by combining the three digital signals S3.51, S3.52, S3.53 which are based on signals S3.31, S3.32, S3.33 and result from the scanning of relatively rough graduation track 2.1. For example, the calculation is based on a coordinate transformation, by which digital signals S3.51, S3.52, S3.53 are initially transferred into a Cartesian coordinate system and are then evaluated according to conventional methods. In particular, position value P3.71 is formed from signals S3.51 (0°) and S3.52 (120°), and position value P3.72 is formed from signals S3.52 (120°) and S3.53 (240°). Thus, each position value P3.71, P3.72 represents position information within one rotation of graduated disk 2 about axis of rotation R. In the ideal case, position values P3.71, P3.72 would each therefore assume the same value. Due to manufacturing and assembly tolerances inevitably occurring, as well as because of changing environmental influences, position values P3.71, P3.72 will deviate from each other, even if only slightly. Such deviations are ascertained in comparator 3.20, and compared to a predefined limiting value, which is stored in a memory 3.21. In the event a deviation is greater than the limiting value, a fault message E3.20 is output.

Analogous to the formation of comparatively rough position values P3.71, P3.72, the substantially finer position information is also processed electronically from the three digital signals S3.61, S3.62, S3.63, in the course of which, three position values P3.81, P3.82, P3.83, ascertained independently of each other, are likewise calculated in logic circuits 3.81, 3.82, 3.83 and are then processed in an averager 3.102 to form an average value P3.102. By forming average value P3.102, an extremely exact measuring result is achieved, which in addition, is largely free of harmonic components of the third order. The influence of fluctuations in distance between scanning printed circuit board 1 and graduated disk 2 on the measuring result is therefore minimized. Average value P3.102 and the three position values P3.81, P3.82, P3.83 are passed on to a comparison element 3.122 that has a memory 3.1221 in which a value for the permissible deviation between average value P3.102 and each individual position value P3.81, P3.82, P3.83 is stored. As soon as an unacceptably high deviation is determined in comparison element 3.122, a fault message E3.122 is output.

In connecting circuit 3.90, fine average value P3.102 is connected to comparatively rough position value P3.72, so that as a result, a high-resolution, absolute position value P with regard to the angular position is generated by connecting circuit 3.90.

Furthermore, in order to satisfy increased safety-related requirements, the connection of fine average value P3.102 to position value P3.72 is checked for plausibility in a connection-monitoring unit 3.91. For this purpose, the difference between average value P3.102 and position value P3.72 is ascertained. Likewise, a limiting value is read out from a memory 3.911 and compared to the ascertained difference. As soon as an unacceptably great difference is determined in connection-monitoring unit 3.91, a fault message E3.91 is output.

The fault messages of comparator 3.20, of connection-monitoring unit 3.91 and of comparison element 3.122 possibly occurring are passed on to interface module 5. There, the values are further processed according to a desired transmission protocol, and are transmitted via plug-in connector 5.1 and a cable to sequential electronics 4.

For example, sequential electronics 4 may be a numerical control of a machine, sequential electronics 4 including a further interface module 4.20 and a comparator 4.1. Transmitted position value P3.71 and transmitted absolute position value P3.102 are converted by interface module 4.20 of sequential electronics 4 and supplied to comparator 4.1. In order to ensure that no errors have occurred during the data transmission, a check test is performed again in comparator 4.1. Transmitted position value P3.71 is now compared to transmitted absolute position value P3.102, in doing which, here as well, the deviation of position values P3.71, P3.102 being compared to a predefined limiting value, which is stored in a memory 4.11. As soon as an unacceptably great deviation is determined in comparator 4.1, a fault message E4.1 is output. Thus, sequential electronics 4 output fault message E if they have received at least one of fault messages E3.20, E3.91 or E3.1221 from ASIC module 3 of the position sensor, or if fault message E4.1 was generated by comparator 4.1 in sequential electronics 4.

In particular, the measuring system presented has the advantage that it satisfies the highest safety requirements. The reason is that digital signals S3.51, S3.52, S3.53, S3.61, S3.62, S3.63 are based on analog signals S1.11, S1.12, S1.13; S1.21, S1.22, S1.23, which are conducted on signal paths that are independent of each other. Because receiver tracks 1.1; 1.2 each include three receiver printed conductors 1.11, 1.12, 1.13; 1.21, 1.22, 1.23 by which signals S1.11, S1.12, S1.13; S1.21, S1.22, S1.23 are detectable, whose relative phase shifts, with 120°, in each case deviate from n·90° (with n as a natural number), the safety is further increased. Thus, when working with this system, it is immediately recognizable, for example, whether one of receiver printed conductors 1.11, 1.12, 1.13; 1.21, 1.22, 1.23 has failed because of a defect.

A further aspect with regard to the high safety of the measuring system is that position values P3.71, P are first compared after the data transmission has been carried out in sequential electronics 4. In this manner, faults which are first produced by the data transmission may also be recognized and handled by output of a corresponding fault message E.

What is claimed is:

1. An inductive position sensor, comprising:
   a scanning printed circuit board including an excitation printed conductor and a receiver track;
   a graduation element at least one of (a) displaceable and (b) rotatable relative to the scanning printed circuit board and including a graduation track having alternating electrically conductive and nonconductive graduation regions; and
   an electronic circuit;
   wherein the receiver track includes three receiver printed conductors adapted to detect signals in response to a relative movement between the graduation element and the scanning printed circuit board;
   wherein a phase shift between at least one pair of the signals deviate from a natural number multiple of 90°; and
   wherein the electronic circuit is adapted to generate three digital signals from the signals detected by the receiver printed conductors, to ascertain at least two position values by combining the three digital signals, and to supply the position values to a comparator.

2. The inductive position sensor according to claim 1, wherein the receiver track includes a first receiver track and a second receiver track having a plurality of receiver printed conductors arranged on the scanning printed circuit board, the graduation element including a first graduation track and a second graduation track, the receiver printed conductors of the first receiver track adapted to generate a smaller number of signal periods than the receiver printed conductors of the second receiver track in response to identical relative movements between the scanning printed circuit board and the graduation element.

3. The inductive position sensor according to claim 1, wherein electronic circuit is adapted to supply the position values to an averager.

4. The inductive position sensor according to claim 3, wherein the electronic circuit is adapted to generate three digital signals from signals detected by receiver printed conductors of a second receiver track arranged on the scanning printed circuit board, to ascertain at least two position values by combining the three digital signals generated from the signals detected by the receiver printed conductors of the second receiver track, and to supply to the averager the position values ascertained by combining the three digital signals generated from the signals detected by the receiver printed conductors of the second receiver track.

5. The inductive position sensor according to claim 3, wherein the electronic circuit is adapted to supply an average value generated by the averager to a comparator.

6. The inductive position sensor according to claim 1, wherein the receiver printed conductors are adapted to detect signals having phase shifts of at least one of (a) 60° and (b) 120° in response to relative movement between the graduation element and the scanning printed circuit board.

7. A method for operating an inductive position sensor, including: a scanning printed circuit board having an excitation printed conductor and a receiver track including a plurality of receiver printed conductors; and a graduation element at least one of (a) displaceable and (b) rotatable relative to the scanning printed circuit board and including a graduation track having alternating electrically conductive and nonconductive regions, comprising:
   in response to a relative movement between the graduation element and the scanning printed circuit board, detecting signals in the receiver printed conductors, a phase shift between at least one pair of the signals deviating from a natural number multiple of 90°;
   generating three digital signals by an electronic circuit from the detected signals;
   ascertaining at least two position values by combining the three digital signals;
   comparing the position values to each other; and
   outputting a fault message in response to a deviation of the position values that exceeds a predefined limit value.

8. The method according to claim 7, wherein the receiver track includes a first receiver track and a second receiver track having a plurality of receiver printed conductors arranged on the scanning printed circuit board, the graduation element including a first graduation track and a second graduation track, the method further comprising:
   in response to identical relative movements between the scanning printed circuit board and the graduation element, generating a smaller number of signal periods by the receiver printed conductors of the first receiver track than by the receiver printed conductors of the second receiver track.

9. The method according to claim 7, further comprising supplying the position values to an averager.

10. The method according to claim 9, further comprising:
    generating three digital signals in the electronic circuit from signals detected by receiver printed conductors of a second receiver track arranged on the scanning printed circuit board;
    ascertaining at least two position values by combining the three digital signals generated from the signals detected by the receiver printed conductors of the second receiver track; and
    supplying to the averager the position values ascertained by combining the three digital signals generated from the signals detected by the receiver printed conductors of the second receiver track.

11. The method according to claim 9, further comprising supplying an average value generated by the averager to a comparator.

12. The method according to claim 7, further comprising detecting signals having phase shifts of at least one of (a) 60° and (b) 120° by the receiver printed conductors in response to relative movement between the graduation element and the scanning printed circuit board.

13. A measuring system, comprising:
    an inductive position sensor including:
       a scanning printed circuit board including an excitation printed conductor and a receiver track;
       a graduation element at least one of (a) displaceable and (b) rotatable relative to the scanning printed circuit board and including a graduation track having alternating electrically conductive and nonconductive graduation regions; and
       an electronic circuit;
    a data interface; and
    sequential electronics including a comparator;
    wherein the receiver track includes three receiver printed conductors adapted to detect signals in response to a relative movement between the graduation element and the scanning printed circuit board;
    wherein a phase shift between at least one pair of the signals deviate from a natural number multiple of 90°;

wherein the electronic circuit is adapted to generate three digital signals from the signals detected by the receiver printed conductors, to ascertain at least two position values by combining the three digital signals, and to supply the position values to the comparator via the data interface.

14. The measuring system according to claim 13, wherein the sequential electronics is adapted to output a fault message in response to a deviation of the two position values that exceeds a predefined limit value.

15. The measuring system according to claim 13, wherein the receiver track includes a first receiver track and a second receiver track having a plurality of receiver printed conductors, the graduation element including a first graduation track and a second graduation track, the sequential electronics including a connection circuit;

wherein the receiver printed conductors of the first receiver track are adapted to generate a smaller number of signal periods than the receiver printed conductors of the second receiver track in response to identical relative movements between the scanning printed circuit board and the graduation element; and wherein the connection circuit is adapted to combine digital position values generated from the signals of the receiver printed conductors to form one position value.

16. The inductive position sensor according to claim 1, wherein the inductive position sensor is adapted to be operated according to the method recited in claim 7.

17. The inductive position sensor according to claim 1, wherein the inductive position sensor is adapted for use in the measuring system recited in claim 13.

18. The method according to claim 7, wherein the inductive position sensor is arranged as recited in claim 16.

19. The method according to claim 7, wherein the inductive position sensor is arranged as the inductive position sensor of the measuring system recited in claim 13.

20. The measuring system according to claim 13, wherein the inductive position sensor is arranged as recited in claim 1.

21. The measuring system according to claim 13, wherein the inductive position sensor is adapted to be operated according to the method recited in claim 7.

* * * * *